No. 637,285. Patented Nov. 21, 1899.
J. M. E. RIEDEL & O. F. J. GRAHL.
FUNNEL.
(Application filed Mar. 7, 1898. Renewed Feb. 25, 1899.)
(No Model.)
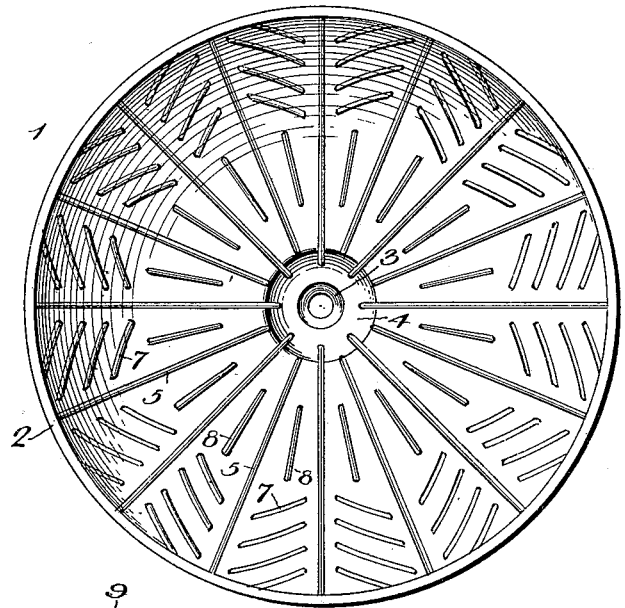
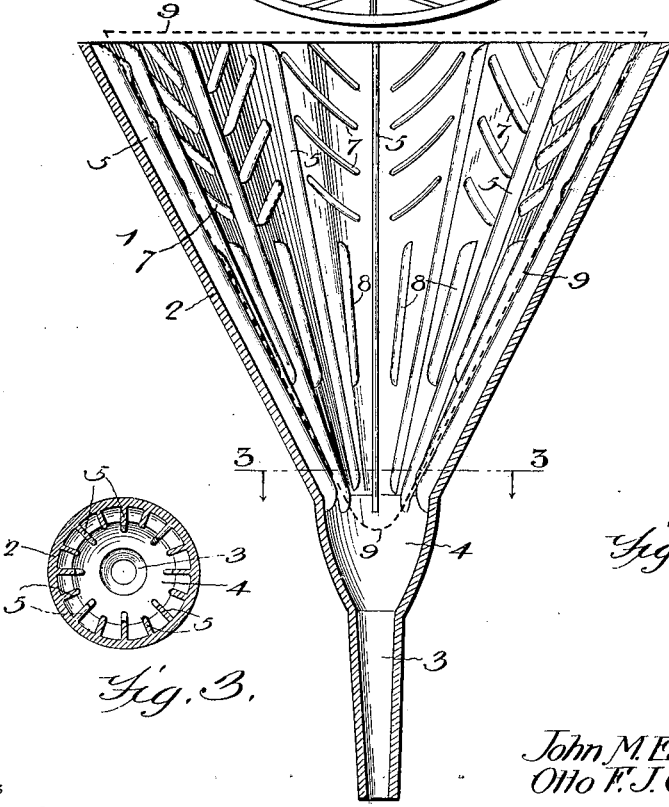
Witnesses
J. Grant Culverwell,
H. F. Beinhorn
By Their Attorneys.
John M. E. Riedel and
Otto F. J. Grahl, Inventors.
C. A. Snow & Co.

UNITED STATES PATENT OFFICE.

JOHN M. E. RIEDEL AND OTTO F. J. GRAHL, OF FORT WAYNE, INDIANA.

FUNNEL.

SPECIFICATION forming part of Letters Patent No. 637,285, dated November 21, 1899.

Application filed March 7, 1898. Renewed February 25, 1899. Serial No. 706,878. (No model.)

*To all whom it may concern:*

Be it known that we, JOHN M. E. RIEDEL and OTTO F. J. GRAHL, citizens of the United States, residing at Fort Wayne, in the county of Allen and State of Indiana, have invented a new and useful Funnel, of which the following is a specification.

The present method of filtering liquids as practiced by pharmacists and others, in which filtering-paper is used as the medium inside of an ordinary funnel, is a very tedious and slow process. As soon as the paper becomes thoroughly soaked with the liquid it flattens out and lies very closely against the flaring walls of the funnel, thereby preventing the liquid from flowing freely down between the funnel and the filtering medium. As the funnel-body is contracted at its lower end where it joins with the spout and as the filtering-paper has a tendency to slip into the spout, the latter is liable to become choked and the free passage of the liquid is interrupted. In our invention we overcome these defects by a novel construction of the funnel which holds the filtering material in place against flattening by capillary attraction upon the flared wall of the funnel and which obviates choking up of the spout by the settling or vertical displacement of the filtering material within said spout.

We are aware that it has heretofore been proposed to provide a funnel with ribs which extend to the spout, but such prior devices have the ribs arranged or grouped in close relation to each other at the spout. Hence the ribs must be made quite small or shallow to provide for the passage of the liquid from bove, and when capillary attraction sets in the filtering material obstructs the flow of liquid from the funnel-body into its spout. We provide the funnel with an enlarged throat between the spout and the flared body, thus forming a chamber of greater cross-sectional area than the diameter of the spout, and above this chamber terminates the lower extremities of the ribs or projections, thus insuring free flow of the liquid from the funnel-body into the enlarged throat and enabling ribs or projections of proper depth to be used on the interior surface of the funnel-body for holding the filtering material in place against the capillary attraction between the filtering material and the funnel.

The invention consists, therefore, in a funnel especially adapted for holding a filtering material provided with a throat or chamber between its body and the spout and with projections arranged to hold a filtering material in spaced relation to said funnel for the purpose of forming spaces adapted to permit the free flow of the filtered liquid and for the unobstructed escape of the air from the vessel into which said liquid is adapted to pass.

The invention consists, further, of a filtering-funnel provided with a throat or chamber between the body and the spout and spacing projections on the inner surface of the body, certain of said projections terminating contiguous to the throat or chamber. We also employ a series of longitudinal ribs within the funnel-body which extend from the enlarged throat upwardly and are spaced at suitable intervals from each other, and between said longitudinal ribs are provided other ribs or projections which prevent the folded paper from flattening out in the intervals between the longitudinal ribs.

To enable others to understand our invention, we have illustrated the preferred embodiment thereof in the accompanying drawings, forming a part of this specification, and in which—

Figure 1 is a vertical longitudinal sectional view through a funnel constructed in accordance with our invention. Fig. 2 is a plan view thereof. Fig. 3 is a transverse sectional view on the plane indicated by the dotted line 3 3 of Fig. 1.

Like numerals of reference denote like and corresponding parts in each of the several figures of the drawings.

Our improved funnel for use in connection with the layer of paper as a filtering medium is designated in its entirety in the accompanying drawings by the numeral 1. The said funnel consists of a body 2, a spout 3, and an enlarged throat 4 intermediate between the funnel-body and the spout thereof and forming a chamber of greater cross-sectional area than the diameter of the spout, as clearly indicated by Figs. 1 and 2 of the drawings.

To prevent the layer of filtering-paper which is placed within the funnel-body from flattening against and upon the inner surfaces of said body when the layer of filtering-paper becomes thoroughly saturated with the liquid, we provide ribs or projections on the inner surface of the body and which terminate at the entrance to the enlarged throat 4 of the funnel. The ribs may be of suitable form and arrangement within the funnel-body, but it is essential to our invention that the funnel be constructed with the enlarged throat and that the ribs or projections shall terminate at the entrance to said throat. In the drawings we have illustrated a preferred arrangement of the projections, which consists of the longitudinal ribs 5, the diagonal ribs 7, and the short longitudinal ribs 8, all of said ribs being of uniform depth throughout the inner surface of the funnel-body. The ribs 5 extend longitudinally of the funnel-body, substantially from the upper edge thereof, and terminate at their lower ends, as at 6, at the entrance to the enlarged throat, and said longitudinal ribs are spaced at suitable intervals apart. In the intervals between said longitudinal ribs 5 are arranged the ribs 7 and 8, the depth of which is substantially equal to that of the longitudinal ribs 5. The ribs 7, between two adjacent longitudinal ribs 5, are arranged diagonally to the ribs 5 at the upper part of the funnel-body, but the short ribs 8 lie below the diagonal ribs 7 and in the direction of the length of the body, said short ribs 8 terminating above the terminals of the ribs 5, all as clearly indicated by Fig. 1.

In the construction of our funnel the body 2 is flared or of substantially inverted-cone shape, and the lower part of said body is swelled or flared outwardly for the purpose of producing in the funnel the enlarged throat 4, from which extends the contracted spout 3. The funnel may be made in a single piece of metal, glass, rubber, or any other suitable material, or said funnel may be made in sections and its parts suitably joined together.

Within the ribbed surface of the flared funnel-body is arranged the layer of filtering material, (indicated by dotted lines at 9,) the lower edge or extremity of which enters the enlarged throat 4 of the funnel, and this filtering material or paper is supported by the ribs or flanges away from and free from contact with the inner surface of the funnel-body, thus providing channels or ducts within the funnel, through which channels the filtered liquid is free to flow uninterruptedly into the enlarged throat 4 and thence through the spout into a suitable vessel.

The ribs or flanges provided in our funnel are quite thin. In fact, they are nearly of uniform thickness from the line where they join the body to the free edges thereof. The arrangement of the short ribs in the intervals between the longitudinal ribs 5 prevents the filtering-paper from flattening out and having contact with the inner surface of the funnel in the spaces between the ribs. The enlarged throat between the funnel-body and the spout enables us to employ ribs which are the same height at their lower ends as at their upper ends, and as the ribs converge toward the throat they are grouped quite closely together to properly support the filtering-paper adjacent to the throat without the employment of short ribs between the longitudinal ribs. The described arrangement of ribs supports the filtering material or layer 9 throughout the length of the funnel-body and free from contact with the inner surface thereof, and said ribs form the ducts or channels for the flow of the liquid through the funnel and into the enlarged throat thereof. Said throat 4, furthermore, permits the liquid to flow freely through the same into the spout, and as the filtering material is held by the ribs 5 away from contact with the body and the throat any tendency of the filtering material to settle downwardly into the funnel and the throat 4 thereof does not choke the spout or throat, whereby the throat insures the free flow of the filtered liquid through the funnel and into the spout.

It will be noted that the funnel at a point between its body and the spout is formed with a bulged or enlarged portion which interrupts the continuity of the taper of the body toward the spout. It will also be observed that certain of the ribs or projections terminate at or contiguous to the throat or chamber. In the construction shown the ribs 7 and 8 terminate above the throat and within the limits of the body, while the other ribs 9 terminate at or in the spout.

Our improved funnel is simple and durable in construction. The filtering agent is readily removable to permit access to be obtained to the interior surface of the funnel for the purpose of cleansing the same. The device is cheap of manufacture, and it is efficient and reliable in service.

It is evident that changes in the form and proportion of parts may be made by a skilled mechanic without departing from the spirit or sacrificing the advantages of the invention.

Having thus described the invention, what we claim is—

1. A funnel comprising a body, a throat, a spout, ribs or flanges extending longitudinally within the body and terminating at the enlarged throat thereof, and projections in the intervals between the longitudinal ribs, substantially as described.

2. A funnel provided with an enlarged throat between its body and spout, the longitudinal ribs extending within the body and having their lower terminals grouped closely together at the entrance to the enlarged throat, and the short and diagonal ribs in the intervals between the longitudinal ribs, substantially as described.

3. A funnel provided on its inner surface with the longitudinal ribs which have their lower extremities grouped closely together, the diagonal ribs in the intervals between the longitudinal ribs, and short ribs below said diagonal ribs and terminating above the lower extremities of said longitudinal ribs, all the ribs being of uniform depth throughout their length, substantially as described.

4. A funnel adapted for holding a filtering material, provided with a throat or chamber between the body and the spout, and with projections on the inner surface of said body, certain of said projections occupying such relation to the throat as to coöperate therewith in holding a layer of filtering material out of contact with the throat for the formation of spaces adapted for the free flow of the filtered liquid through the funnel and for the escape of air between the funnel and said filtering material, as and for the purposes described.

5. A funnel provided with a throat or chamber between the body and the spout and with spacing projections on the inner surface of the body, certain of said projections terminating contiguous to said throat or chamber, substantially as described.

6. A funnel provided with an enlarged throat between the body and the spout, forming a chamber of greater cross-sectional area than the widest portion of the spout, the wall of said throat being bulged outwardly and interrupting the continuity of the taper of the body to the spout, and a series of ribs on the inner surface of the funnel, certain of said ribs terminating contiguous to the throat or chamber, substantially as described.

In testimony that we claim the foregoing as our own we have hereto affixed our signatures in the presence of witnesses.

JOHN M. E. RIEDEL.
OTTO F. J. GRAHL.

Witnesses for Riedel:
B. J. ELLERT,
PAUL F. KUHNE.
Witnesses for Grahl:
W. J. F. PIEPENBRINK,
CHRIST BUHLER.